US00RE46563E

(19) United States
(12) Reissued Patent
Wong

(10) Patent Number: US RE46,563 E
(45) Date of Reissued Patent: Oct. 3, 2017

(54) FOLDABLE BOX

(71) Applicant: Papillon Ribbon & Bow, Inc., Clifton, NJ (US)

(72) Inventor: Chi Yin Wong, New York, NY (US)

(73) Assignee: Papillon Ribbon & Bow, Inc., Clifton, NJ (US)

(21) Appl. No.: 14/721,830

(22) Filed: May 26, 2015

Related U.S. Patent Documents

Reissue of:
(64) Patent No.: 8,573,471
Issued: Nov. 5, 2013
Appl. No.: 12/804,208
Filed: Aug. 12, 2010

(51) Int. Cl.
*B65D 5/36* (2006.01)
*B65D 5/44* (2006.01)
*B65D 5/50* (2006.01)
*B65D 5/24* (2006.01)

(52) U.S. Cl.
CPC ..... *B65D 5/3642* (2013.01); *B65D 5/241* (2013.01); *B65D 5/36* (2013.01); *B65D 5/365* (2013.01); *B65D 5/5026* (2013.01)

(58) Field of Classification Search
CPC ..... B65D 5/3642; B65D 5/36; B65D 5/28
USPC ..... 229/117.07, 117.08, 122.24, 122.26, 186
See application file for complete search history.

(56) References Cited

U.S. PATENT DOCUMENTS 317,795 A * 5/1885 Jaeger ..... 229/117.07
664,835 A * 1/1901 Czarniecki ..... 229/117.08
770,915 A * 9/1904 Maunsell-Smyth ..... 229/122.26
1,054,530 A * 2/1913 Goodyear ..... B65D 5/3642 229/117.07
1,478,336 A * 12/1923 Hunt ..... 229/122.26
2,269,247 A * 1/1942 Borah ..... 229/122.26
RE23,266 E * 9/1950 Thomas ..... B65D 5/3642 229/117.04
2,957,617 A * 10/1960 Bolding ..... B65D 5/3642 229/117.04
2,982,465 A * 5/1961 Fallert ..... B65D 5/3642 229/117.07
3,658,237 A 4/1972 Engel
6,868,968 B1 * 3/2005 Casanovas ..... 229/191
7,481,355 B2 * 1/2009 Hui ..... 229/117.08
2004/0140345 A1 * 7/2004 Kao ..... B65D 5/3657 229/117.07
2005/0279816 A1 * 12/2005 Kao ..... B65D 5/3657 229/186
2006/0151586 A1 * 7/2006 Kao ..... B65D 5/3657 229/186
2006/0237519 A1 * 10/2006 Hui ..... B65D 5/241 229/117.08

(Continued)

*Primary Examiner* — Beverly M Flanagan
(74) *Attorney, Agent, or Firm* — Feldman Law Group, P.C.; Steven M. Crosby

(57) ABSTRACT

A reusable foldable box is disclosed that has a first flat configuration and a second three dimensional configuration. The box consists of a first set and a set of panels that are assembled to form the foldable box. The first set of panels includes at least six panels that are foldably coupled in a predefined sequence. The first set includes a top panel, bottom panel, a pair of side panels, a lip panel and a securing panel. The first set of panels forms a single piece construction to which the side panels of the second set of panels are coupled with triangular inward connectors.

8 Claims, 10 Drawing Sheets

(56) References Cited

U.S. PATENT DOCUMENTS

| | | | | |
|---|---|---|---|---|
| 2008/0099543 | A1* | 5/2008 | Bondarik | B65D 5/36 229/117.08 |
| 2010/0006632 | A1* | 1/2010 | Conroy | 229/117.09 |
| 2012/0037693 | A1 | 2/2012 | Wong | |

* cited by examiner

FOLDABLE BOX

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention related to packaging boxes and more particularly to a foldable box.

2. Description of the Related Art

The foldable boxes of plurality of sizes and uses are available in the prior art. These boxes can be folded and/or unfolded for their use using a variety of folding and unfolding mechanisms. The prior art foldable boxes generally include multiple panels that have a plurality of folds and joints. For example, a foldable box in the art normally includes separate base panels, side panels, and lid panels that are inter connected to each other with a plurality of folds and attachment means such as glue and tape. However, the construction and operation of these boxes become complex and time consuming due to these excessive panels, joints and folds. A user may appreciate a foldable box that uses the least panel components that can be effortlessly connected to each other in such a manner that the box can be unfolded from a folded condition with the least effort.

In addition, the operation of the prior art boxes is not without problems. For example, when these boxes are folded, they do not retain their flat configuration as fastening means adapted to lock the panels is normally externally located. Also, stacking of these boxes in folded condition is a tedious job due to these externally attached fastening means such as, for example, a hinge, a cover flap, a hook and loop fastener and a zip fastener. A user may appreciate a foldable box that can be folded and stacked flat along with an internally located fastening means. A user may also appreciate a foldable box that makes use of one of its panels to facilitate fastening means in the unfolded position of the box.

The prior art boxes include lid panels that are connected to side panels using an externally attached locking means. However, these locking means undergo physical deterioration in the course of time and lose their locking ability. Also these locking means are normally individually attached to the panel sections of the boxes. However, no attempt is seen in the art to make use of foldable panel sections to facilitate locking means for the box instead of using externally attached locking means.

The folding or unfolding of these boxes is frequently a two-handed practice. However, the prior art boxes have structural inability to be operated with a single hand, especially by a person having physical limitations. A user may appreciate a foldable box that is light in weight and has minimum structural and operational mechanism to be comfortably used by a single hand.

There is need of a foldable box that includes minimal structural and operational components to quickly undergo folding and unfolding using a single hand. There is also a need of a foldable box that uses an inbuilt fastening means in one of the panels to hold the box in the unfolded position. There is also a need of a foldable box that uses one of the panels to have an inbuilt locking means that facilitates locking and unlocking means for the box.

SUMMARY

A reusable foldable box is described that has a first flat configuration and a second three dimensional configuration. The foldable box in construction is an assembly of two subassemblies such that each subassembly is a combination of various panels. A first subassembly includes a combination of main panels and subpanels that are foldably coupled in a predefined sequence to define the first subassembly. Main panels are preferably bigger in size than the subpanels.

A second subassembly includes a pair of rectangular subpanels such that each of the panels includes a pair of opposed triangular connectors. Similarly predefined subpanels of the first subassembly include opposed triangular connecting portions. The second subassembly is coupled with predefined subpanels of the first subassembly with the respective triangular connectors and connecting portions. The triangular connectors are coupled with the respective sub panels of the first subassembly with predefined connecting portions. The first subpanel and second subpanels of the second subassembly are coupled alone predefined edges of second main panel of first subassembly.

The second subassembly is assembled with the first subassembly to define the foldable box. A first main panel defines a top cover of the foldable box. The second main panel defines a bottom of the foldable box. The foldable box of claim 4, wherein the first subpanel and second subpanels are coupled alone predefined edges of the second main panel of the first subassembly.

The foldable box is advantageously a simple construction because the box is a combination of two subassemblies. The box includes a combination of magnets and an iron piece for locking it flat, as well as, in three dimensional configurations. The main advantage of the foldable box over the prior art is that the first subassembly is a single piece construction. Hence joining of the two subassemblies results in a complete foldable box.

DETAILED DESCRIPTION OF THE DRAWINGS

Figure 1:
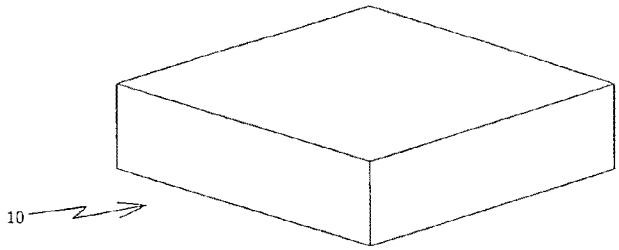
FIG. 1 is a top perspective view of a foldable box in a three dimensional configuration in accordance with a preferred embodiment of present invention.

Although specific terms are used in the following description for the sake of clarity, these terms are intended to refer only to a particular structure of the invention selected for illustration in the drawings, and are not intended to define or limit the scope of the invention.

Referring to FIG. 1, a preferred embodiment of a foldable box 10 in accordance with the present invention is shown. The foldable box 10 has a first closed configuration in which box 10 is closed flat, and a second three dimensional configuration in which the box is built upright. The second configuration is transferable to the first flat configuration. The foldable box 10 includes a first subassembly of panels that is assembled with a second subassembly of panels in a predefined fashion to define the foldable box.

The assembly of first subassembly and second assembly defines the foldable box 10. Each of the panels defining the first and second subassembly includes various panels that are preferably rectangular is shape and are made of materials such as cardboard, flexible plastic, laminated plastics etc. The first subassembly of panels and the second subassembly of panels is laminated with a predefined material. In one embodiment, the size of the box 10 may be 150×150×25(h) mm.

Figure 2:
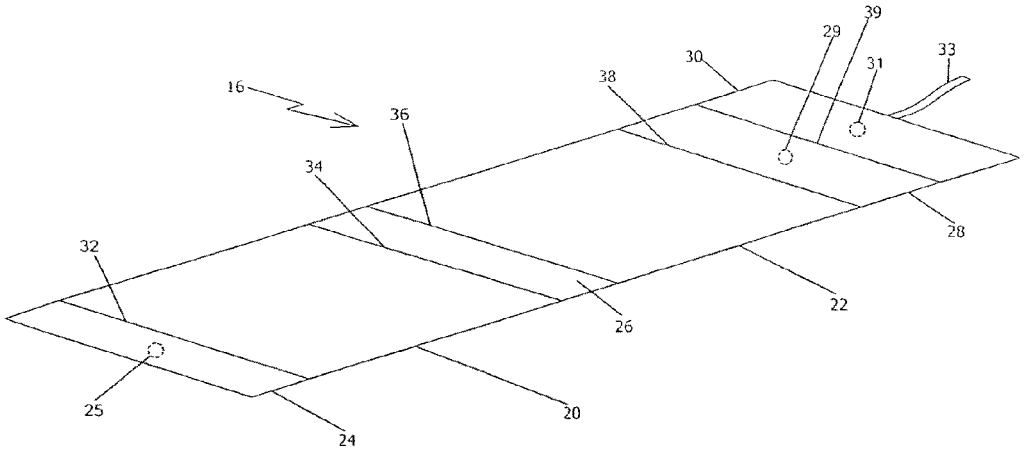
FIG. 2 is a top perspective view of a first subassembly of panels of foldable box of FIG. 1.

Referring to FIG. 2, a first subassembly of panels 16 is shown. The first subassembly of panels 16 includes a plurality of panels that are coupled in a predefined fashion along predefined creases/folds. The first subassembly 16 has two classes of panels such as main panels and sub panels. Main panels are preferably bigger than sub panels. In the preferred embodiment, length of main panels and sub-panels is approximately identical, whereas width of main panels is preferably three times the width of sub-panels.

A first main panel 20 has approximately identical dimensions as that of a second main panel 22. Panels 24, 26, 28 and 30 define sub panels that have approximately identical dimensions. Subpanel 26 is coupled between first main panels 20 and second main panel 22. Panel 28 is coupled between second main panel 22 and sub panel 30. Subpanels 24 and 26 are foldable relative to panel 20 along creases 32 and 34 respectively. Subpanels 26 and 28 are foldable relative to second main panel 22 along creases 36 and 38 respectively. Subpanel 30 is foldable relative to panel 28 along crease 39. The panels 20-30 are preferably laminated to define a uniform construction of the first subassembly of main panels and subpanels.

Subpanel 24 includes an iron sheet 25 that is approximately centrally positioned in the subpanel 24. Subpanels 28 and 30 preferably include magnets 29 and 31. Each of the magnets 29 and 31 is approximately centrally positioned in the respective subpanels 28 and 30 preferably below the lamination. Each of the magnets 29 and 31 is positioned in the respective subpanel such that the magnet is not visible with the naked eye from the subpanel. Thickness of each of the magnets 29 and 31 is substantially close to the thickness of the respective subpanels 28, and 30. Magnet 29 has opposite polarity to that of magnet 31. The subpanel 30 preferably includes a flexible holding means such as a ribbon or a string 33. The first subassembly 16 including main panels and subpanels is preferably made by die cutting, scoring and then folding to define a desired combination of type one and type two panels in a single piece.

Figure 3:
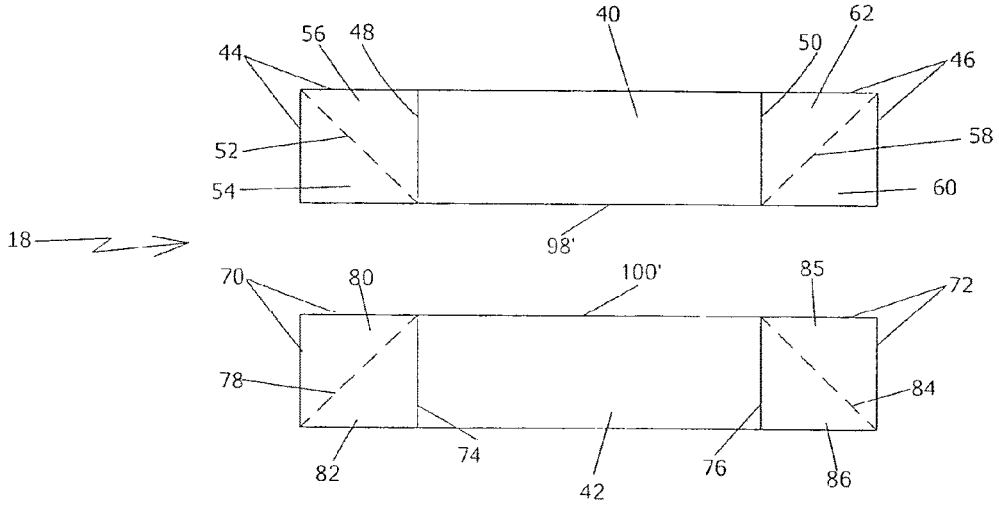
FIG. 3 is a top view of a second subassembly of panels of foldable box of FIG. 1.

Referring to FIG. 3, a second subassembly 18 is shown that includes a first subpanel 40 and a second subpanel 42. The first subpanel 40 includes a pair of opposed panels 44 and 46 that are coupled with opposite ends of first panel along respective creases 48 and 50. Each of the panels 44 and 46 is foldably coupled with panel 40 along respective creases 48 and 50. Panel 44 includes a diagonal fold 52 that defines triangular connectors 54 and 56. Panel 46 includes a diagonal fold 58 that define triangular connectors 60 and 62.

Second subpanel 42 includes a pair of opposed panels 70 and 72 that are coupled with opposite ends of second panel along respective creases 74 and 76. Each of the panels 70 and 72 is foldably coupled with panel 42 along respective crease 74 and 76. Panel 70 includes a diagonal fold 78 that defines triangular connectors 80 and 82. Panel 72 includes a diagonal fold 84 that define triangular connectors 85 and 86. The second subassembly 18 is preferably made by die cutting, scoring and then folding to define the configuration of panels.

Figure 4:
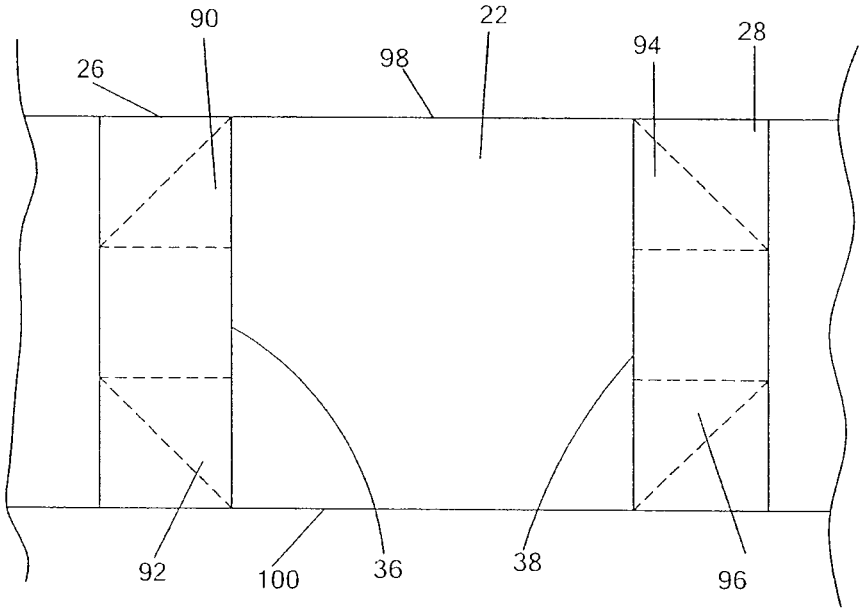
FIG. 4 is a top view of a panel with opposed connecting portions of the first subassembly of foldable box of FIG. 1.

As shown in FIG. 4, the subpanel 26 includes a pair of opposed triangular connecting portions 90 and 92 that are defined along a crease 36. Panel 28 includes a pair of opposed triangular connecting portions 94 and 96 along the crease 38. The second subassembly 18 is foldably coupled with the first subassembly 16 along edges 98 and 100, and further connectors 54, 80, 60, and 86 are coupled with respective connecting portions 90, 92, 94 and 96.

Figure 5:
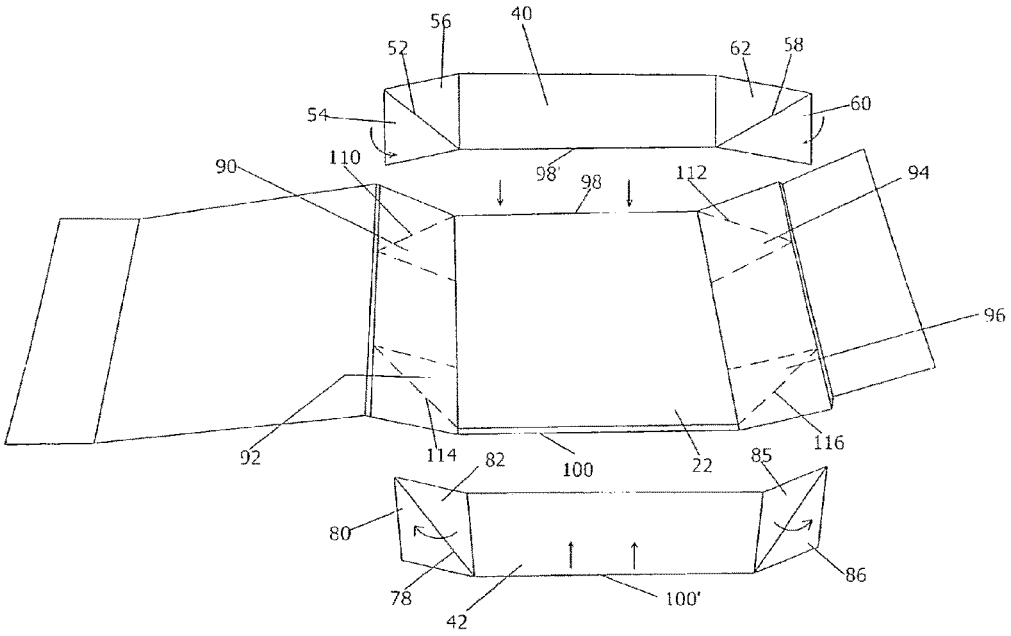
FIG. 5 is a top perspective view of a preferred method of assembling of a second subassembly with the first subassembly of the foldable box of FIG. 1.

Now referring to FIG. 5, the panel 40 is foldably coupled with panel 22 such that edges 98 and 98' are collinear. A crease 52 defines two triangular connectors 54 and 56. A bottom portion of connector 54 is coupled with connecting portion 90 such that crease 52 is coincident with a line 110. A crease 58 defines two triangular connectors 60 and 62. A bottom portion of connector 60 is coupled with connecting portion 94 such that crease 58 is coincident with a line 112. Panel 42 is foldably coupled with panel 22 such that edges 100 and 100' are collinear.

A crease 78 defines two triangular connectors 80 and 82. A bottom portion of connector 80 is coupled with connecting portion 92 such that crease 78 is coincident with a line 114. A crease 84 defines two triangular connectors 85 and 86. A bottom portion of connector 86 is coupled with connecting portion 96 such that crease 84 is coincident with a line 116.

Figure 6:
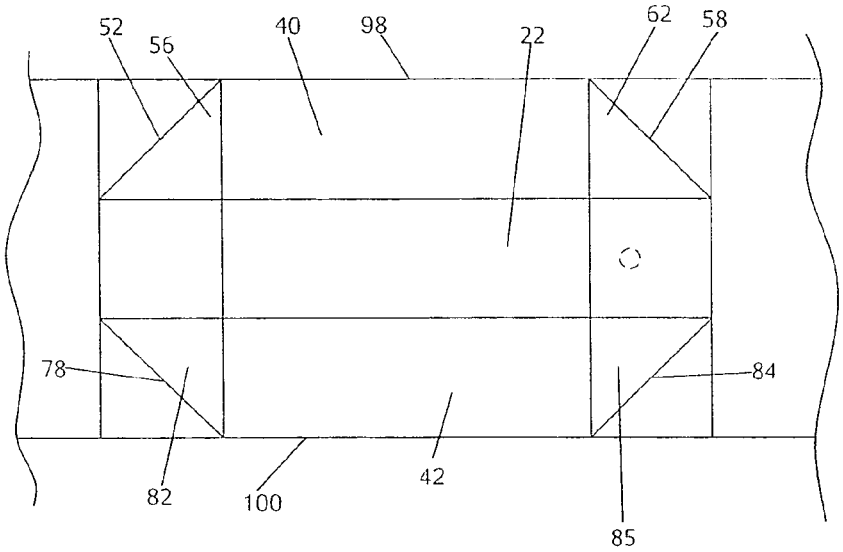
FIG. 6 is a top view of the second subassembly coupled with a second main panel of the first subassembly of foldable box of FIG. 1.

Referring to FIGS. 5 and 6, an assembly of the first subassembly 16 and second subassembly 18 in folded position is described that defines the first closed configuration of the foldable box in accordance with the present invention. In the first closed position, panel 40 is foldably rested on the panel 22 along edge 98, connector 56 is rested on a top portion of connector 54, and connector 62 is rested on a top portion of the connector 60. In a similar fashion, subpanel 42 is foldably rested on the subpanel 22 along edge 100, connector 82 is rested on a top portion of the connector 80, and connector 85 is rested on connector 86.

Figure 7:
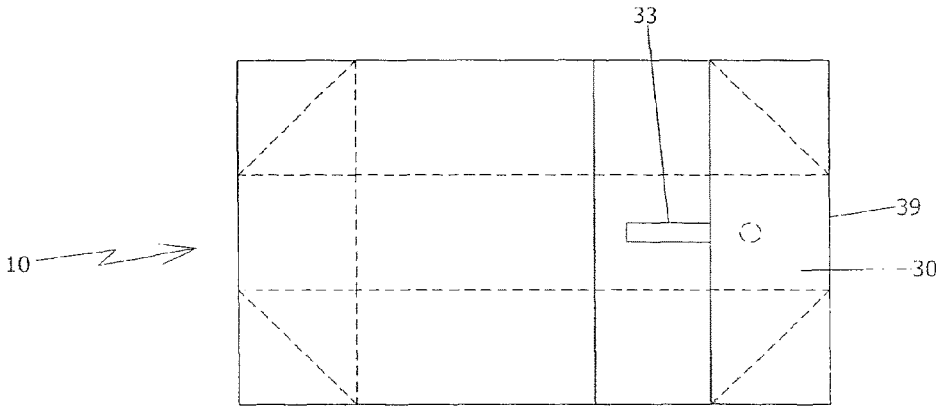
FIG. 7 is a top view of a first flat configuration of the foldable box of FIG. 1
Figure 8:
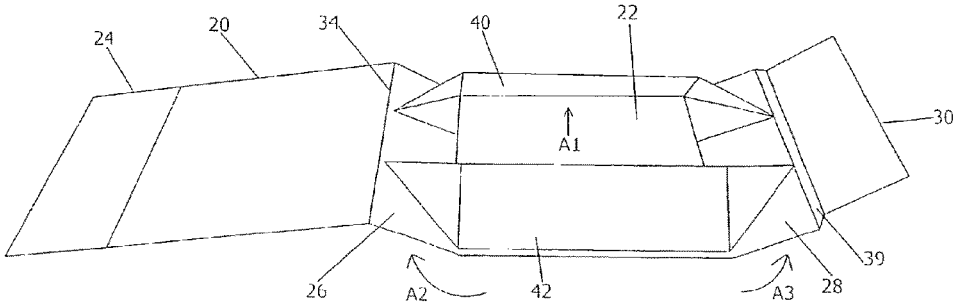
FIG. 8 shows a first step involved in a preferred method of changing a closed configuration of the foldable box of FIG. 1 to a three dimensional second configuration.

Now referring to FIGS. 7 to 11, a preferred method of changing a closed position of the folding box 10 to a three dimensional upright position is described. Initially box 10 is completely folded in the first closed position. Ribbon 33 coupled with panel 30 is pulled in upward direction to pull the panel 30 about crease 40 (FIG. 7). In a next step, panels 20 is opened in upward direction about crease 34. The panel 20 along with panel 24 is preferably rested on an opposite side relative to panel 22.

Figure 9:
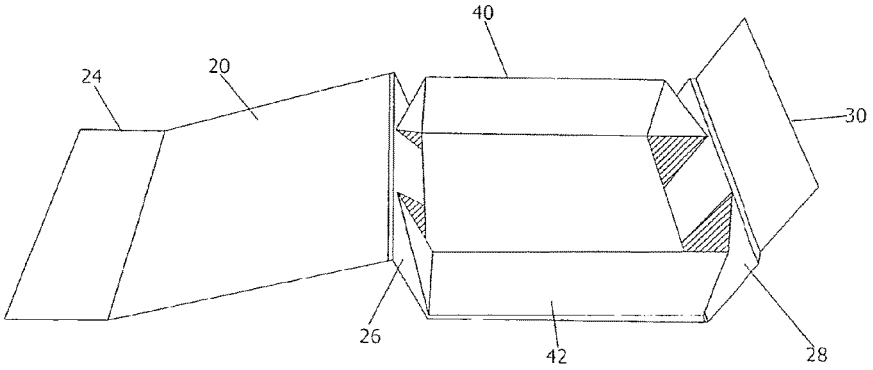
FIG. 9 shows a second step involved in bringing the foldable box of FIG. 1 to the three dimensional second configuration.

In a next step panels 40 and 42 are pulled upward to separate the panels from panel 22 as indicated by arrow A 1. Panels 40 and 42 are folded open to achieve an upright position relative to panel 22. Opening of panels 40 and 42 bring panels 26 and 28 to upright position. The panels 26 and 28 foldably rotate about crease 36 and 38 respectively as indicated by arrow A2 and A3 to achieve upright positions. In a next step panels 40 and 42 are gradually brought to completely upright positions that bring panels 26 and 28 to approximately upright positions (FIG. 9).

Figure 10:
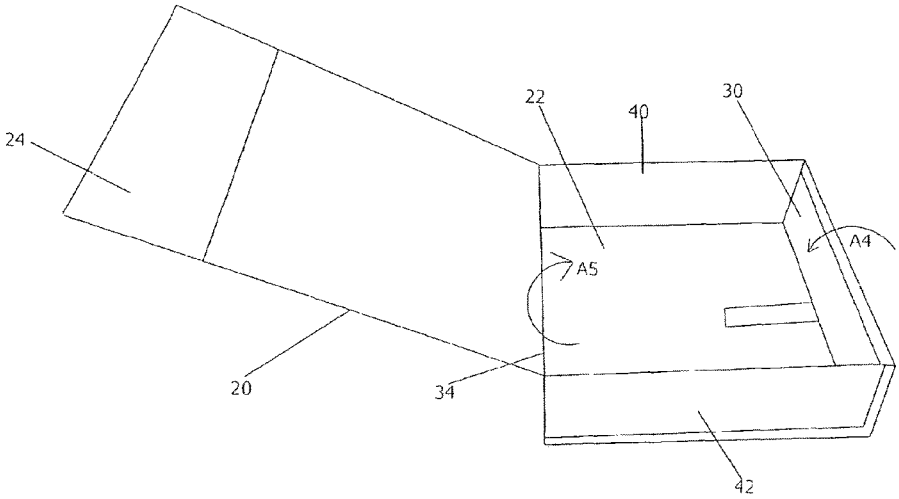
FIG. 10 shows a third step involved in bringing the foldable box of FIG. 1 to the three dimensional second configuration.
Figure 11:
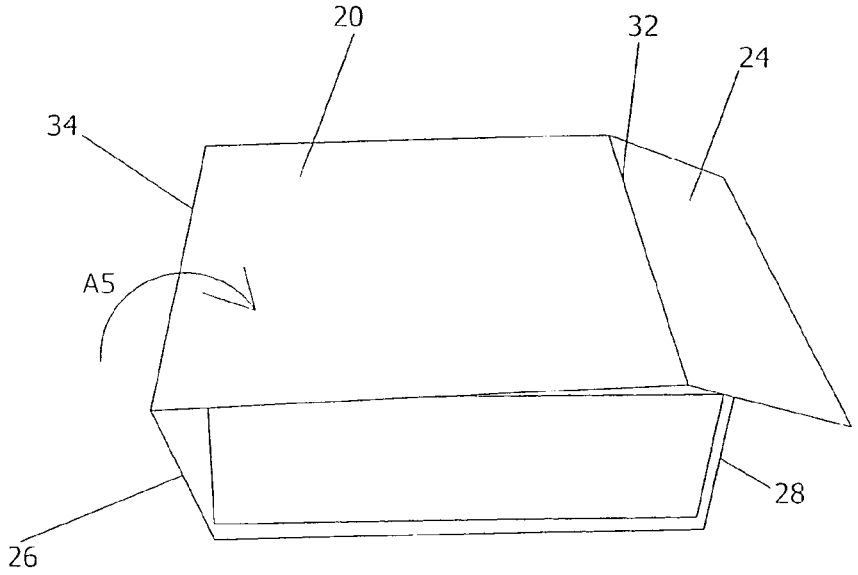
FIG. 11 shows a fourth step involved in locking the foldable box in the closed configuration of the foldable box of FIG. 1.

In a next step, as shown in FIG. 10, panel 30 is folded about crease 39 as indicated by arrow A4. In this step, panels 28 and 30 achieve upright position such that magnet 29 and 30 are coupled to lock panels 28 and 30 to the upright position. In this step, panels 26, 28, 40 and 42 define sides of the foldable box 10 and panel 22 defines a base of the foldable box 10. In a next step, panel 20 is folded about crease 34 in the direction of panel 30 as indicated by arrow A5. Panel 20 defines a top of the box 10.

In a next step, panel 24 is foldably rotated about fold 32 such that panel 24 is positioned on panel 28. The panel is lockable by magnetic forces between iron piece 25 and magnet 29. Subpanels 26, 28, 40 and 42 are in upright position to define the foldable box 10. The box 10 in three dimensional configuration is folded back by following the above mentioned steps in a reverse sequence.

Now referring to FIGS. 1 to 11, the foldable box 10 in accordance with the preferred embodiment of the present invention has two configurations. In the first configuration foldable box 10 is folded to a flat configuration. The foldable box 10 disclosed in the present invention remains completely flat in the folded position. The box 10 in flat configuration is easily convertible to the three dimensional configuration by pulling the ribbon 33 to open the panel 30 followed by bringing the panels 40 and 42 to upright position and then locking the panel 30 with panel 28 to lock respective magnets 31 and 29. Panels 26, 28, 30, 40 and 42 define the space within box 10 that can accommodate desired items to be stored. The second main panel 22 defines a bottom of the foldable box 10. Box 10 is then closed by panel 20 and then locking panels 24 and 28 with respective iron sheet 25 and magnet 29. The first main panel 20 defines a top cover of the box 10.

The foldable box 10 includes an inbuilt magnetic locking arrangement. The locking arrangement doesn't project out of respective panels which advantageously facilitates a flat configuration to box 10. The flat configuration is most suited for storing a number of foldable boxes 10 in stacks within available space. The foldability of the box 10 makes the box 10 most suitable to reuse the box 10 for a number of times. A user may carry a foldable box 10 in a container such as a purse if needed.

The foldable box 10 in the present invention is a simple assembly of two subassemblies of the first subassembly 16 and second subassembly 18. The first subassembly 16 is includes two types of rectangular panels. The first type of panels are termed as main panels that are that preferably approximately thrice in breadth than the second type of panels termed as subpanels. However, it is understood that the first subassembly 16 is a single construction with a combination foldably coupled main panels and subpanels in a predefined sequence. Thus the foldable box 10 is advantageously simple for a final assembly that defines the foldable box 10. The box 10 is made with minimal structural components. Most importantly the box 10 is locked in both flat and three dimensional configurations as well.

The foregoing description of the preferred embodiments of the present invention has been presented for the purpose of illustration and description. It is not intended to be exhaustive or to limit the invention to the precise form disclosed. Many modifications and verifications are possible in light of the above teaching. It is intended that the scope of the invention be limited not by this detailed description, but rather by the claims appended hereto. Since many embodiments of the present disclosure can be made without departing from the spirit and scope of the present invention, the present invention resides in the claims hereafter appended.

What is claimed is:

1. A reusable foldable box having a first flat configuration and a second three dimensional configuration, comprising:

a first set of panels having at least six panels having predefined shapes that are foldably coupled in a predefined sequence;

a second set of panels having a pair of opposed side panels, each side panel has two opposed inward triangular connectors on each end and any of the two adjacent triangular connecters are defined by a respective inside diagonal fold; and the second set of panels being securely coupled to the first set of panels to define the foldable box that is closed by a magnetic locking arrangement, wherein the first set of panels include a top panel, a bottom panel, a pair of side panels with at least two opposed pairs of triangular connectors each, a securing panel with a [magnetic] *first* piece *of the magnetic locking arrangement* and a lip panel with [an iron] *a second* piece *of the magnetic locking arrangement, wherein a height of the pair of side panels is equal to a height of the securing panel and the lip panel, and wherein one of the pair of the side panels includes a third piece of the magnetic locking arrangement that (1) magnetically connects the securing panel and the one of the pair of the side panels and (2) magnetically connects the lip panel and the one of the pair of the side panels*.

2. The foldable box of claim 1 wherein each inward triangular connector of the second set of panels is coupled with respective triangular connecting portion of respective side panels of the first set of panels.

3. The foldable box of claim 1, wherein the magnetic locking arrangement piece is defined by the magnetic piece of the securing panel and the iron piece of the lip panel.

[4. The foldable box of claim 1, wherein the side panel adjacent to the securing panel includes another magnetic piece that connects the securing panel and respective side panel in the second three dimensional configuration of the box.]

5. A reusable foldable box having a first flat configuration and a second three dimensional configuration, comprising:

a first set of panels having at least five panels having predefined shapes that are foldably coupled in a predefined sequence;

a second set of panels having a pair of opposed side panels, each side panel has two opposed inward triangular connectors on each end and any of the two adjacent triangular connecters are defined by a respective inside diagonal fold;

a securing panel being foldably coupled to a side panel of the first set of panels; and the second set of panels being securely coupled to the first set of panels to define the foldable box that is closed by a magnetic locking arrangement, wherein the first set of panels include a top panel, a bottom panel, a pair of side panels with at least two opposed pairs of triangular connectors each, a securing panel with a [magnetic] *first* piece *of the magnetic locking arrangement* and a lip panel with [an iron] *a second* piece *of the magnetic locking arrangement, wherein a height of the pair of side panels is equal to a height of the securing panel and the lip panel, and wherein one of the pair of the side panels includes a third piece of the magnetic locking arrangement that (1) magnetically connects the securing panel and the one of the pair of the side panels and (2) magnetically connects the lip panel and the one of the pair of the side panels.*

*6. A reusable foldable box, comprising:*

*a first set of panels having at least six panels having predefined shapes that are foldably coupled in a predefined sequence, the first set of panels include a lip panel, a top panel, a first side panel, a bottom panel, a second side panel and a securing panel;*

*a second set of panels including a third side panel and a fourth side panel, the third side panel and the fourth side panel each having two opposed triangular connectors on each end, the two opposed triangular connecters being defined by a diagonal fold, the second set of panels being securely coupled to the first set of panels;*

*a magnetic locking arrangement, the magnetic locking arrangement being inbuilt within the securing panel, the lip panel and the second side panel, wherein a height of the second side panel is equal to a height of the securing panel and the lip panel;*

*an opened three dimensional configuration wherein the securing panel and the second side panel are locked via a first piece of the magnetic locking arrangement and a second piece of the magnetic locking arrangement.*

*7. The foldable box of claim 6 further comprising:*

*a closed three dimensional configuration wherein the securing panel and the second side panel are locked via a first piece and a second piece of the magnetic locking arrangement, and the lip panel and the second side panel are locked via the first piece and a third piece the magnetic locking arrangement.*

*8. A reusable foldable box, comprising:*

*a first set of panels having at least five panels having predefined shapes that are foldably coupled in a predefined sequence, the first set of panels includes a lip panel, a top panel, a first side panel, a bottom panel and a second side panel;*

*a second set of panels including a third side panel and a fourth side panel, the third side panel and the fourth side panel each having two opposed triangular connectors on each end, the two opposed triangular connecters being defined by a diagonal fold, the second set of panels being securely coupled to the first set of panels;*

*a securing panel foldably coupled to the second side panel;*

*a magnetic locking arrangement, the magnetic locking arrangement being inbuilt within the securing panel, the lip panel and the second side panel, wherein a height of the second side panel is equal to a height of the securing panel and the lip panel; and*

*an opened three dimensional configuration wherein the securing panel and the second side panel are locked via a first piece of the magnetic locking arrangement and a second piece of the magnetic locking arrangement.*

*9. The foldable box of claim 6 further comprising:*

*a closed three dimensional configuration wherein the securing panel and the second side panel are locked via a first piece and a second piece of the magnetic locking arrangement and the lip panel and the second side panel are locked via the first piece and a third piece the magnetic locking arrangement.*

* * * * *